US012379354B2

(12) United States Patent
Leveille et al.

(10) Patent No.: US 12,379,354 B2
(45) Date of Patent: Aug. 5, 2025

(54) PORTED END FITTING FOR A LIQUID CHROMATOGRAPHY COLUMN WITH AN INTEGRATED VALVE/TEE HAVING ADDITIONAL INPUT AND/OR OUTPUT

(71) Applicant: Waters Technologies Corporation, Milford, MA (US)

(72) Inventors: Wade P. Leveille, Douglas, MA (US); Sylvain G. Cormier, Mendon, MA (US); Michael O. Fogwill, Uxbridge, MA (US); Joseph D. Michienzi, Plainville, MA (US); Jeffrey Musacchio, Sharon, MA (US); Joseph D. Antocci, Leominster, MA (US)

(73) Assignee: Waters Technologies Corporation, Milford, MA (US)

( * ) Notice: Subject to any disclaimer, the term of this patent is extended or adjusted under 35 U.S.C. 154(b) by 789 days.

(21) Appl. No.: 17/513,003

(22) Filed: Oct. 28, 2021

(65) Prior Publication Data

US 2022/0128526 A1 Apr. 28, 2022

Related U.S. Application Data

(60) Provisional application No. 63/106,673, filed on Oct. 28, 2020.

(51) Int. Cl.
*B01D 15/22* (2006.01)
*G01N 30/60* (2006.01)

(52) U.S. Cl.
CPC ......... *G01N 30/6017* (2013.01); *B01D 15/22* (2013.01); *G01N 30/6004* (2013.01); *G01N 30/606* (2013.01)

(58) Field of Classification Search
CPC ............ G01N 30/6017; G01N 30/606; G01N 30/6004; B01D 15/22
See application file for complete search history.

(56) References Cited

U.S. PATENT DOCUMENTS 9,822,772 B2 11/2017 Stearns et al.
2015/0198255 A1* 7/2015 Gamache ................ F16K 5/201
137/1

(Continued)

FOREIGN PATENT DOCUMENTS

EP 2667189 A1 11/2013
EP 3330705 A1 6/2018

(Continued)

OTHER PUBLICATIONS

International Search Report and Written Opinion for International Patent Application No. PCT/US2021/056981, mailed Feb. 7, 2022.

(Continued)

*Primary Examiner* — Benjamin L Lebron
(74) *Attorney, Agent, or Firm* — Goodwin Procter LLP (57) ABSTRACT

Exemplary embodiments integrate a tee or valve into an outlet end fitting of a liquid chromatography column. The tee or valve is suitable for providing additional fluidic flow paths to ports of the end fitting and eliminates the need for post-column fluidic conduits connecting to tees or valves to insert fluidic inputs or divert flow to outputs. This integration decreases the distance that eluent from the liquid chromatography column has to travel to reach a detector relative to systems that use external tees or valves while providing tee/valve functionality and reducing the fluidic volume post-column. As a result, the exemplary embodiments help decrease sample dispersion.

15 Claims, 9 Drawing Sheets

(56) References Cited

U.S. PATENT DOCUMENTS

| | | | | |
|---|---|---|---|---|
| 2016/0291021 A1* | 10/2016 | Guette | ............ | G01N 33/57415 |
| 2017/0209812 A1* | 7/2017 | Dlugasch | ............... | G01N 30/16 |
| 2017/0361244 A1* | 12/2017 | Lacki | ................ | B01D 15/1807 |
| 2021/0389286 A1* | 12/2021 | Shalliker | .............. | G01N 30/603 |

FOREIGN PATENT DOCUMENTS

| | | | | |
|---|---|---|---|---|
| WO | 2005079543 A2 | 9/2005 | | |
| WO | WO-2020093095 A1 * | 5/2020 | ........... | G01N 30/603 |

OTHER PUBLICATIONS

International Preliminary Report on Patentability for International Patent Application No. PCT/US2021/056981, mailed May 11, 2023.

* cited by examiner

PORTED END FITTING FOR A LIQUID CHROMATOGRAPHY COLUMN WITH AN INTEGRATED VALVE/TEE HAVING ADDITIONAL INPUT AND/OR OUTPUT

CROSS REFERENCE TO RELATED APPLICATION

This application claims the benefit of U.S. Provisional Application No. 63/106,673, filed Oct. 28, 2020 and entitled "PORTED END FITTING FOR A LIQUID CHROMATOGRAPHY COLUMN WITH AN INTEGRATED VALVE/TEE HAVING ADDITIONAL INPUT AND/OR OUTPUT", the entire disclosure of which is hereby incorporated by reference.

BACKGROUND

Figure 1:
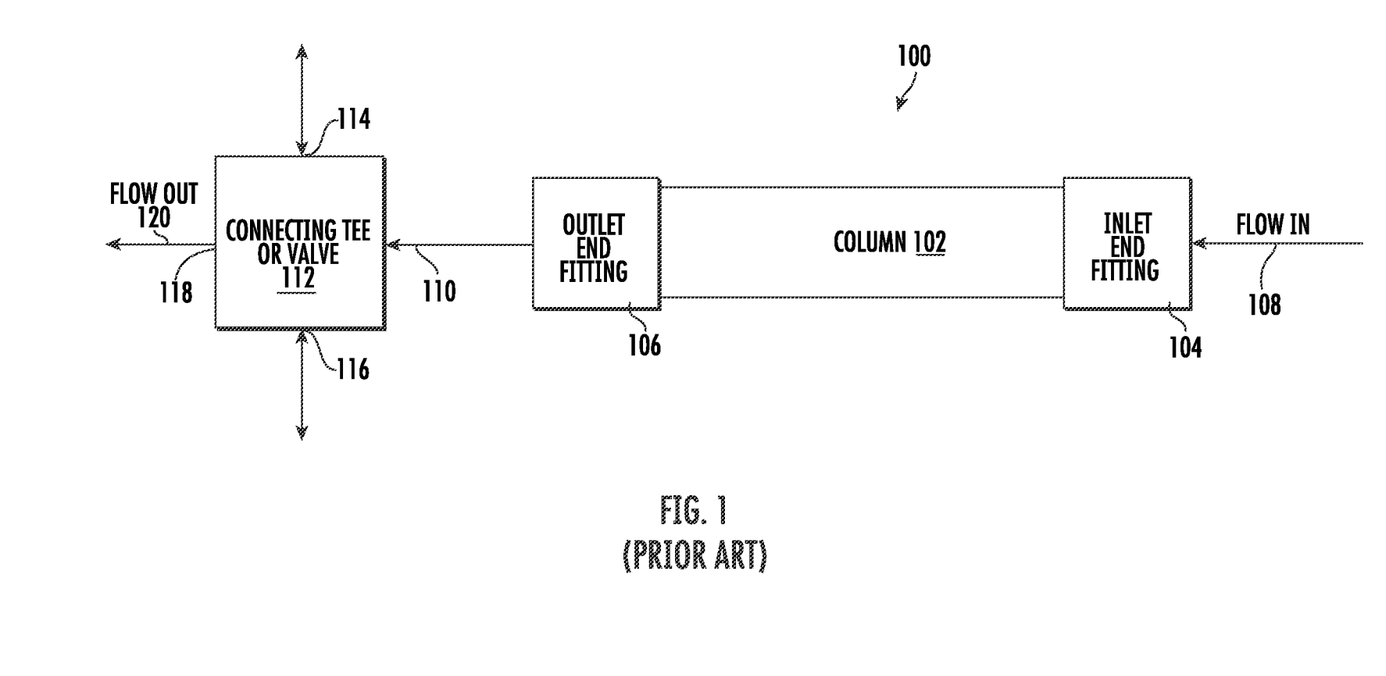
FIG. 1 depicts a conventional arrangement where a connecting tee or valve is positioned after a liquid chromatography column on a post-column flow path.

FIG. 1 depicts a conventional arrangement 100 for adding additional fluidic input into a fluidic output from a liquid chromatography column 102 and/or diverting a portion of the fluidic output from the liquid chromatography column 102. The liquid chromatography column 102 has an inlet end fitting 104 and an outlet end fitting 106. The inlet end fitting 104 receives fluidic flow 108 into the liquid chromatography column 102. The inlet fluidic flow 108 may be a mobile phase, such as a solvent in which a sample of analyte is injected. The outlet end fitting 106 includes an outlet for outputting fluidic flow 110 from the liquid chromatography column 102. A connecting tee or valve 112 may be positioned along the flow path to provide a post-column infusion via a port 114 or to provide a post-column diversion of the fluidic flow 110. The connecting tee or valve 112 has an output port 118 for outputting the flow out 120 typically toward a detector.

SUMMARY

In accordance with an inventive aspect, an end fitting for a liquid chromatography column includes an interface for a fluidic connection with a liquid chromatography column to receive output fluidic flow from the liquid chromatography column. The end fitting also includes a first port for outputting fluidic flow and a first fluidic path leading from the interface to the first port. The end fitting further includes a second port for receiving a fluidic input that is distinct from the output flow of the liquid chromatography column and a second fluidic path leading from the second port to merge into the first fluidic path so that fluidic input from the second port is added to the output fluidic flow from the liquid chromatography column.

The end fitting may include an integral tee that provides the first fluidic path and the second fluidic path. The end fitting may further include a third port and a third fluidic path for diverting output fluidic flow from the liquid chromatography column to the third port, where the third fluidic path is part of the integral tee. The end fitting may include a third port and a third fluidic path for diverting output fluidic flow from the liquid chromatography column to the third port. The end fitting may include a valve for controlling at least some of the fluidic paths. The valve may be, for instance, a rotary valve, a ball valve, a linear shear valve, a spool valve or a pin valve. The valve may have a position that opens the third fluidic path and another position that closes the third fluidic path. The valve may have a position that opens the second fluidic path and a position that closes the second fluidic path.

In accordance with a further inventive aspect, an end fitting for a liquid chromatography column includes an interface for a fluidic connection with a liquid chromatography column to receive fluidic flow from the liquid chromatography column. The end fitting also includes multiple output ports for outputting an output fluidic flow including at least in part the output fluidic flow from the chromatography column. The end fitting additionally includes an integral valve for selecting which of the output ports the receives the output fluidic flow. In some arrangements, the valve may select only a single one of the output ports to receive the output fluidic flow at a time. The end fitting may include an input port for receiving an input and a first fluidic flow path from the input port and merging with fluidic flow from the liquid chromatography column. The valve may control whether the first fluidic flow path is opened or closed. The end fitting may have an additional output port for receiving fluidic flow diverted from the liquid chromatography column along a second fluidic flow path. The valve may control whether the second fluidic flow path is opened or closed.

In accordance with an additional inventive aspect, an end fitting for a liquid chromatography column includes an interface for a fluidic connection with a liquid chromatography column to receive fluidic flow from the liquid chromatography column. The end fitting also includes at least one output port for outputting output fluidic flow including at least in part the output fluidic flow from the chromatography column and at least one input port for receiving a for inputting at least one input fluidic flow. The end fitting additionally includes at least one fluidic flow path leading to the at least one input port and at least one fluidic flow path leading to the at least one output port. The end fitting has an integral valve for opening and closing the at least one fluidic flow path leading to the at least one input port and/or for opening and closing at least one fluidic flow path leading to the at least one output port.

There may be multiple input ports and separate fluidic flow paths leading to respective ones of the input ports. The integral valve may open and close the separate fluidic paths leading to respective ones of the input ports. There may be multiple output ports and separate fluidic flow paths leading to respective ones of the output ports. The integral valve may open and close the separate fluidic paths leading to respective ones of the output ports.

DETAILED DESCRIPTION

One drawback with having the connecting tee or valve 112 positioned post-column as in conventional arrangement 100 is that it increases the distance between the liquid chromatography column and the detector. The added distance increases sample dispersion (e.g., peak band spreading).

Exemplary embodiments address this problem of the conventional arrangement 100 by integrating the tee or valve into the outlet end fitting of the liquid chromatography column. This decreases the distance that eluent from the liquid chromatography column has to travel to reach the detector and reduces the fluidic volume post-column. Such reduction in post-column system volume improves the extra-column dispersion of the system and results in narrower chromatographic peaks and improved signal to noise at the detector. As a result, the exemplary embodiments decrease sample dispersion.

Figure 2:
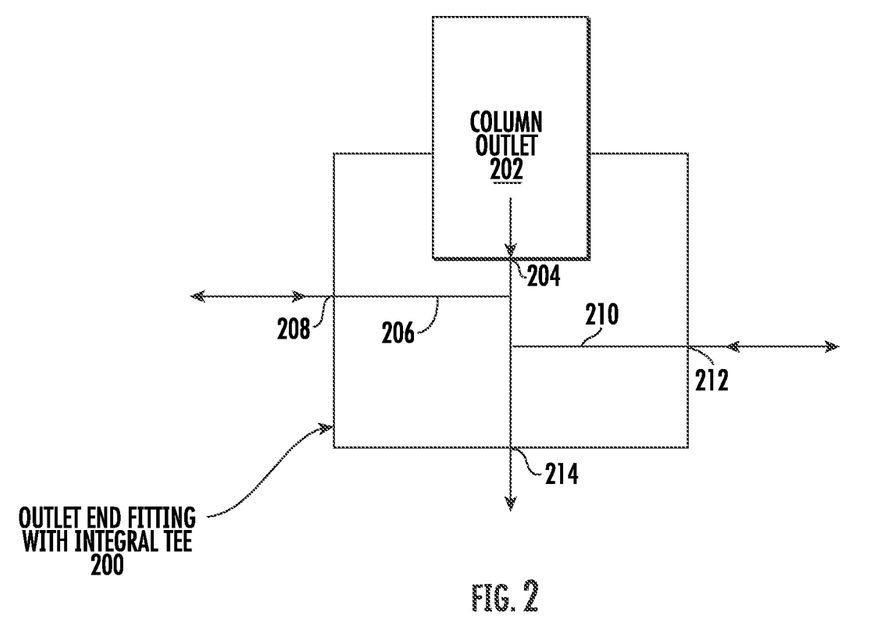
FIG. 2 depicts a diagram of an illustrative end fitting in which an integral tee is formed in an exemplary embodiment.

FIG. 2 depicts an example of an outlet end fitting 200 that includes an integral tee in an exemplary embodiment. The outlet end 202 of a liquid chromatography column is connected to the outlet end fitting 200. The end fitting 200 may be a nut, a cap or other component that is secured to the outlet end 202 of a liquid chromatography column. The outlet end fitting 200 may be made of metal, such as steel, plastic, polycarbonate or other material that exhibits the requisite physical properties, such as strength, thermal characteristics, etc. The output flow from the liquid chromatography column (i.e., the eluent) is output on a fluidic flow path 204. The integral tee provides fluidic flow paths 206 and 210. Fluidic flow path 206 extends from port 208 to a junction with fluidic flow path 204. Fluidic flow path 210 extends from port 212 to a junction with fluidic flow path 204. Ports 208 and 212 may each be used as an output port to divert a portion of the fluidic flow exiting the liquid chromatography column or may be used to receive fluidic input that is fed to flow path 204. Fluidic flow path 204 ends at output port 214.

It should be appreciated that the tee may have additional fluidic flow paths leading to additional ports other than ports 208 and 212.

Figure 3:
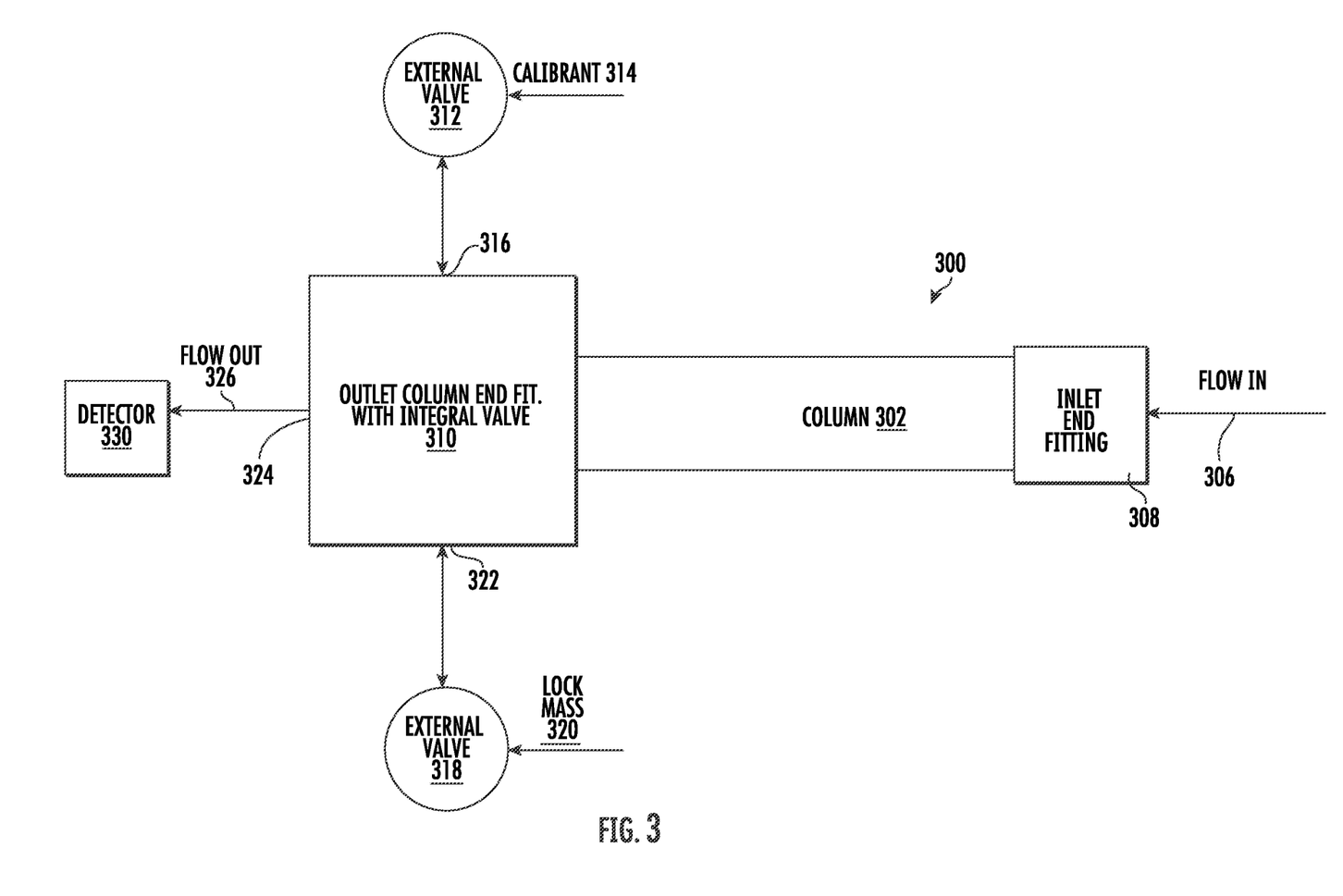
FIG. 3 depicts a diagram of an end fitting like that of FIG. 2 with an integral tee to facilitate input of a calibrant or a lock mass compound.

FIG. 3 depicts an example of a liquid chromatography arrangement 300 having such an end fitting 310 with an integral tee. Fluidic flow 306 (e.g., solvent with a sample) enters the liquid chromatography column 302 via an inlet provided in an inlet end fitting 308. The fluidic flow passes through the liquid chromatography column 302 to the outlet column end fitting 310. The fluidic flow 326 passes out of the column via an outlet port 324. In the example shown, ports 316 and 322 are provided. Port 316 is shown as connected to an external valve 312 that may introduce a calibrant 314 from a calibrant source. The calibrant 314 may be used for calibration of the detector 330 (positioned downstream). The calibrant 314 may be introduced when only solvent is passed through the liquid chromatography column 302. The calibrant 314 enters port 316 and merges with the solvent. The solvent and calibrant 314 pass downstream to the detector 330 where the calibrant 314 is used for calibration. In the example, a lock mass compound 320 is introduced under the control of external valve 318 for introduction with solvent passing through the liquid chromatography column 302 via port 322. The lock mass compound 320 is a compound of known mass used in calibration. The lock mass compound 320 may then pass downstream to the detector 330.

Figure 4A:
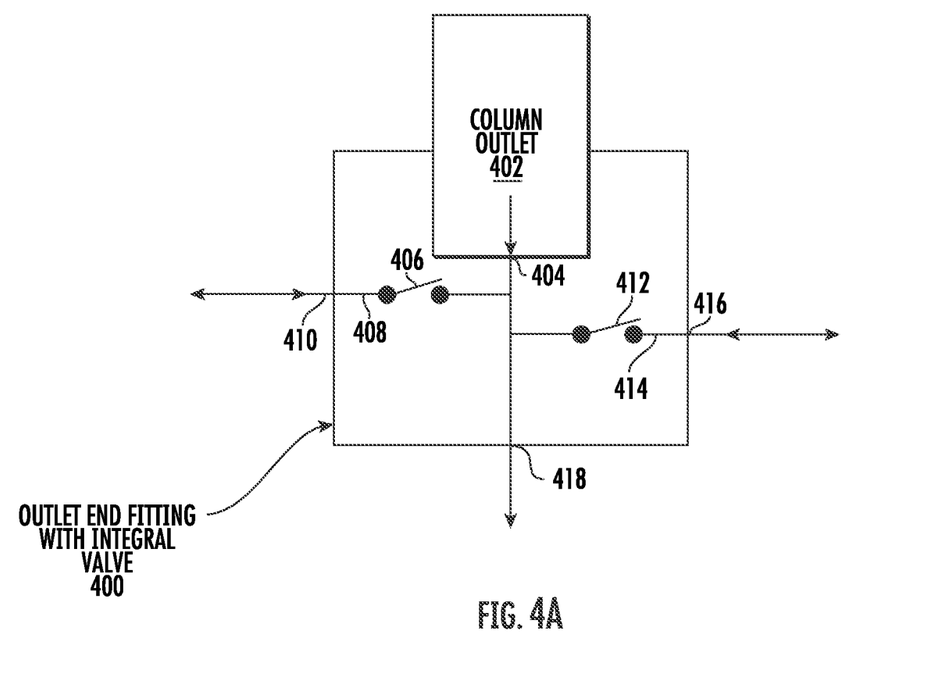
FIG. 4A depicts a diagram of an illustrative end fitting in which an integral valve is positioned for multiple inputs, outputs or a combination of an input and an output in an exemplary embodiment.

Instead of having a static tee, the end fitting for a liquid chromatography column may have an integral valve in exemplary embodiments. FIG. 4A depicts an outlet end fitting 400 having an integral valve. The outlet end fitting 400 is connected to the outlet end 402 of a liquid chromatography column. The output flow from the liquid chromatography column passes to fluidic flow path 404 that extends to output port 418. A fluidic flow path 408 extends from port 410 to a junction with fluidic flow path 404. The integral valve acts like a switch having a gate 406 that may be opened as shown to prevent use of the fluidic flow path 408 or may be closed to permit use of the fluidic flow path 408. The depiction is functional and the actual mechanism for realizing the described functionality may vary with the type of valve used. Thus, there may be no need for an external valve 312 as used with the end fitting 310 of FIG. 3. The outlet end fitting 400 also includes fluidic flow path 414 that extends from port 416 to a junction with fluidic flow path 404. The valve controls whether the gate 412 is opened or closed and thus controls whether the fluidic flow path 414 may be used or not.

Figure 4B:
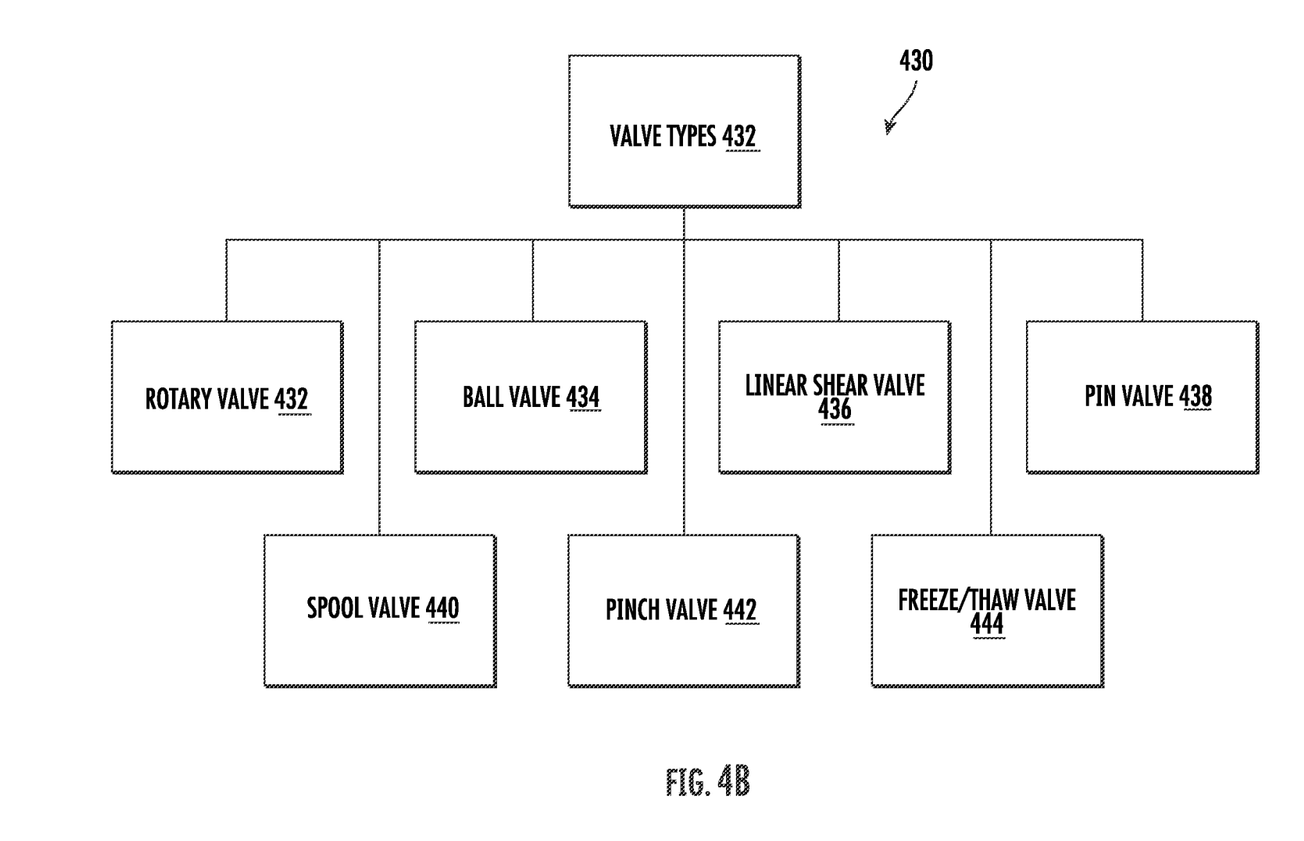
FIG. 4B depicts a diagram of different valve types that may be used in an end fitting in an exemplary embodiment.

FIG. 4B shows a diagram 430 of different types of valves 432 that may be integrated into an end fitting, such as end fitting 400 of FIG. 4A. As shown in the first row of the diagram 430, the integral valve may be a rotary valve 432, a ball valve 434, a linear shear valve 436 or a pin valve 438. The integral valve may be a spool valve 440, a pinch valve 442 or a freeze/thaw valve 444 as shown in the second row of the diagram 430.

Figure 5:
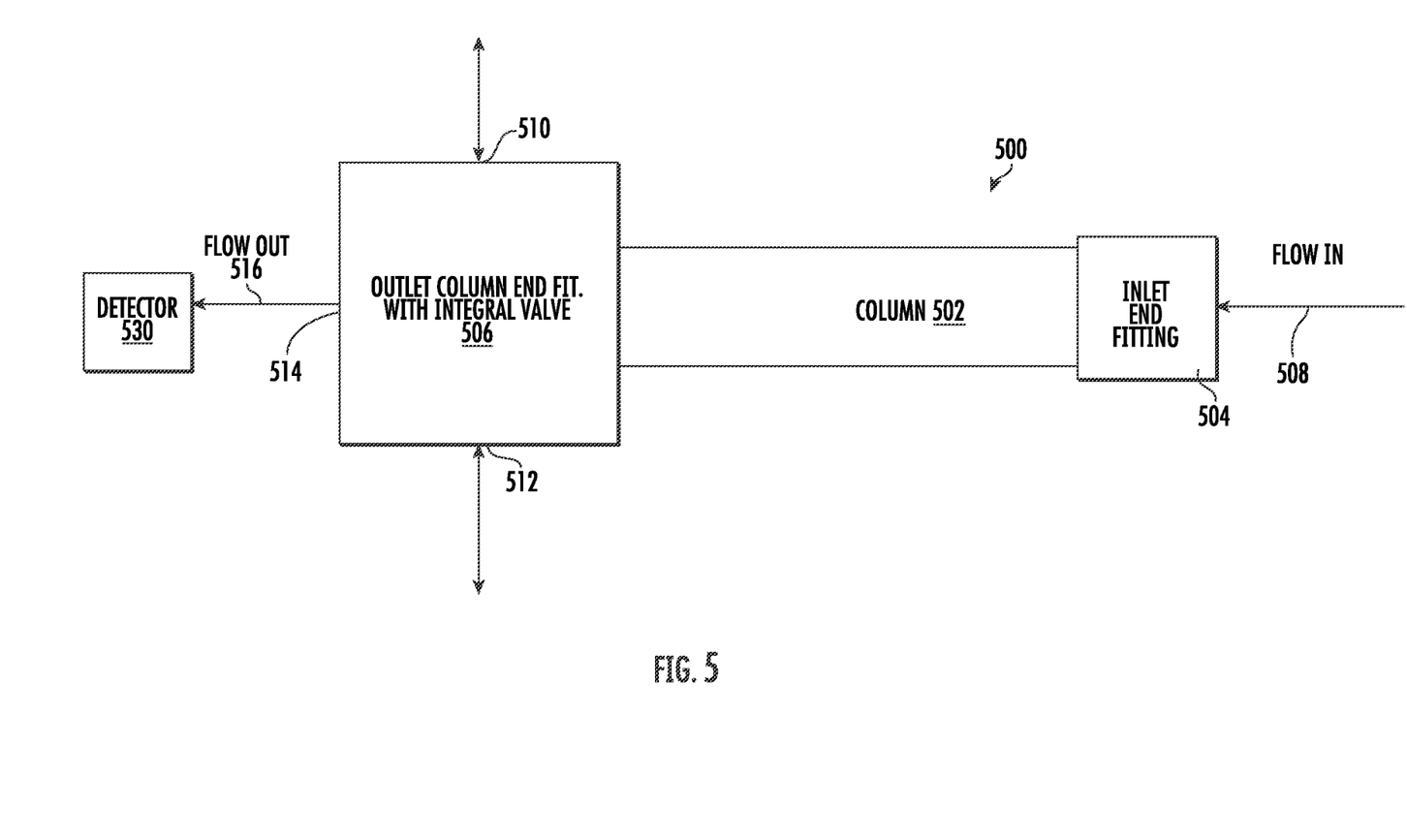
FIG. 5 depicts a diagram of an end fitting like that of FIG. 4 with an integral valve to control flow paths to ports for inputs and/or outputs.

FIG. 5 depicts an illustrative liquid chromatography arrangement 500 for an exemplary embodiment where an outlet end fitting 506 with an integral valve is used. Fluid flow 508 flows into the liquid chromatography column 502 via an inlet in the inlet end fitting 504. The flow 516 passes through the outlet end fitting and out port 514. The integral valve in the outlet end fitting 506 controls whether input flows into or output flows out of the ports 510 and 512. The output flows downstream to a detector 530.

Figure 6:
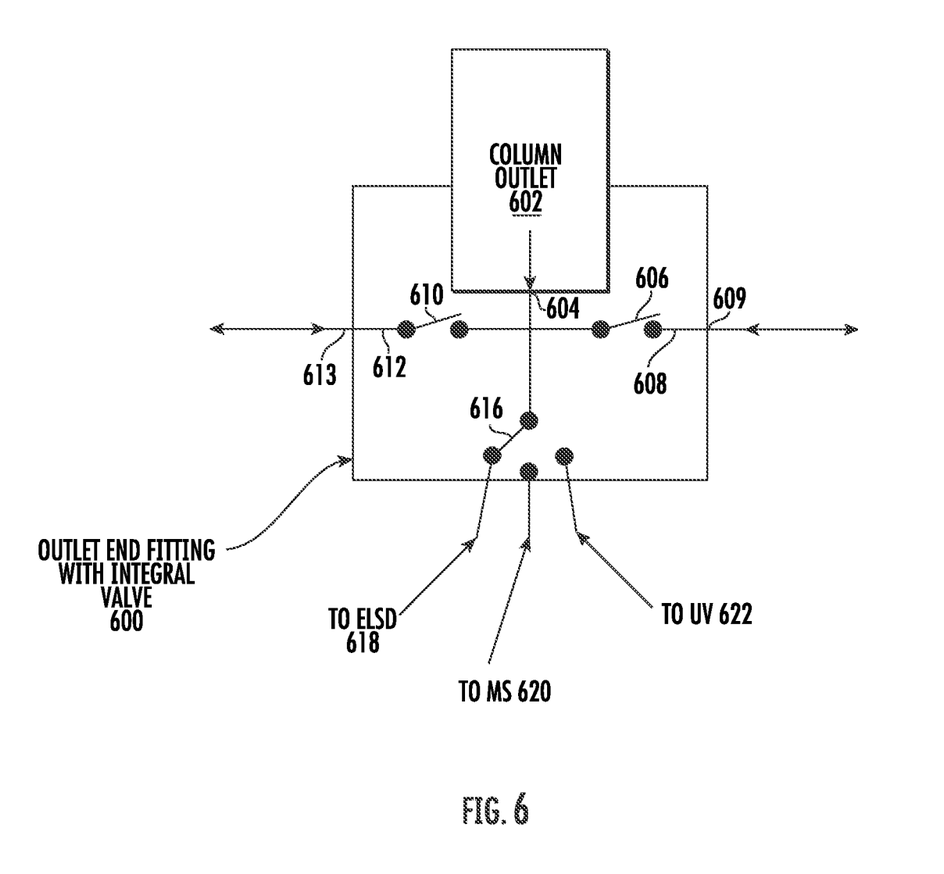
FIG. 6 depicts a diagram of an illustrative end fitting like that of FIG. 4 with an additional valve component for controlling where an output of the liquid chromatography column is directed.

FIG. 6 depicts an alternative outlet end fitting 600 with an integral valve that also controls where output on fluidic flow path 604 is directed. The integral valve is largely like that shown in FIG. 4. The valve controls fluidic paths 608 and 612 leading to respective ports 609 and 613 as indicated by gates 606 and 610, such as described above relative to FIG. 4A. Fluidic flow paths 608 and 612 merge at junctions with fluidic flow path 604, which receives the fluidic output flow form the outlet end 602 of liquid chromatography column. The difference with the integral valve of FIG. 6 to that of FIG. 4A is that the integral valve of FIG. 6 controls where the fluidic flow from the liquid chromatography column flows. The gate 616 represents that the valve may choose the output to go to one of three destination flow paths. The fluidic flow may be directed to a flow path 618 leading to an evaporative light scattering detector (ELSD). The fluidic flow may be directed to a flow path 620 leading to a mass spectrometer (MS). Lastly, the fluidic flow may be directed to a flow path 622 leading to an ultraviolet detector (UV).

Figure 7:
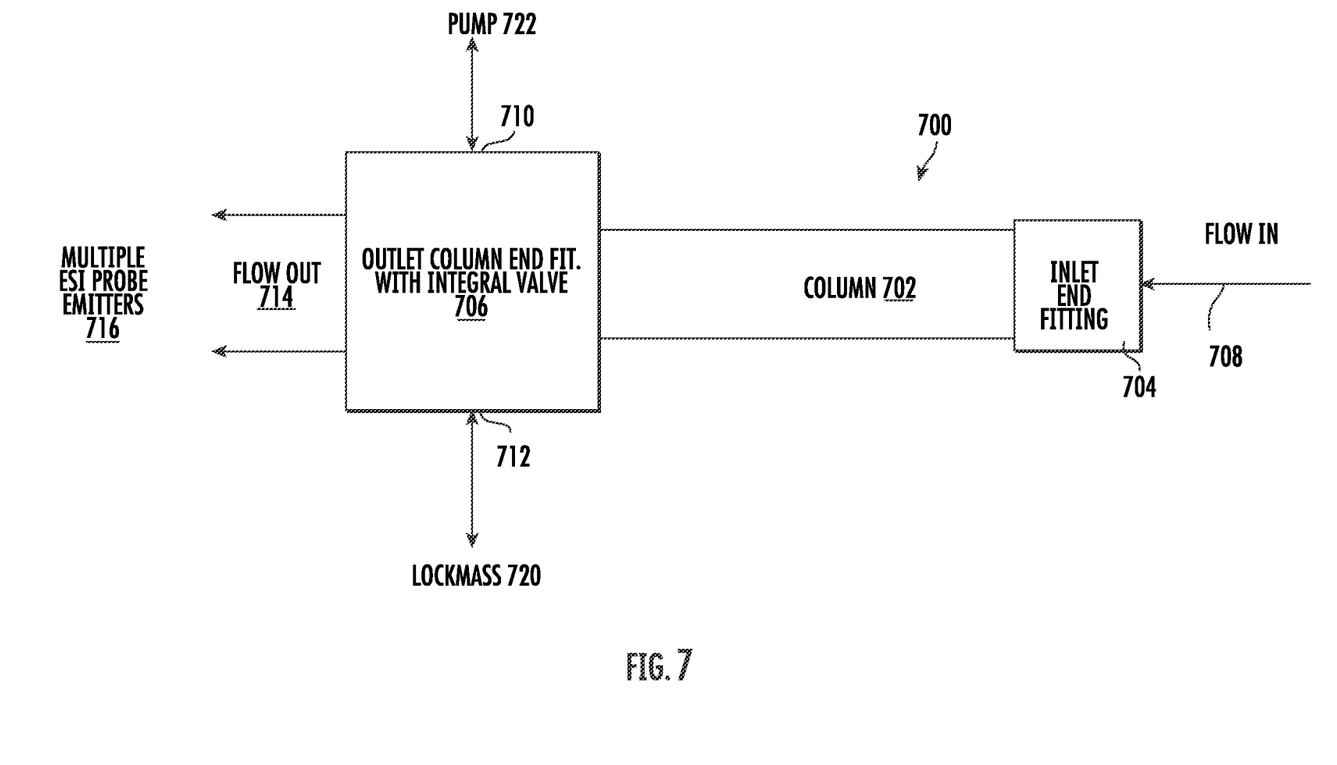
FIG. 7 depicts a diagram of an end fitting like that of FIG. 6 with an integral valve to control flow paths to ports for inputs and/or outputs.

FIG. 7 depicts a diagram 700 of an illustrative liquid chromatography arrangement of an exemplary embodiment where the outlet end fitting 706 includes an integral valve like that of FIG. 6. The input fluidic flow 708 enters a liquid chromatography column 702 via an inlet at an inlet end fitting 704. The fluidic flow passes through the liquid chromatography column 702, and the fluidic flow 714 exits out through the outlet end fitting 706 to the destination. In this illustrative case, the output flow may pass to multiple electrospray probe emitters 716, such as found with certain MS systems. In this example, a lock mass compound 720 may be input via port 712 of the end fitting for calibration. An input from a pump 722 may be input to the end fitting via port 710.

There are a variety of ways that the liquid chromatography column and valve/tee may be configured relative to the outlet end fitting in exemplary embodiments. As shown in a configuration 800 of FIG. 8A, the valve/tee 806 may be preconnected to the liquid chromatography column 804. A feature 812 may be provided as an integral part of the column to provide the geometry to position and seat the liquid chromatography column 804. The valve/tee 806 and liquid chromatography column 804 are connected to the outlet end fitting 802, such as an end nut, by inserting the valve/tee 806 into seat 808 that is sized and shaped to receive the valve/tee 806. The insertion is in the direction 810. The liquid chromatography column 804 passes through the seat 808 until the feature 812 rests in seat 814. A cylindrical passage 816 is provided for accommodating the proximal end of the liquid chromatography column 804. This configuration facilitates insertion of the valve/tee 806 and the liquid chromatography column 804 as a unit.

Figure 8A:
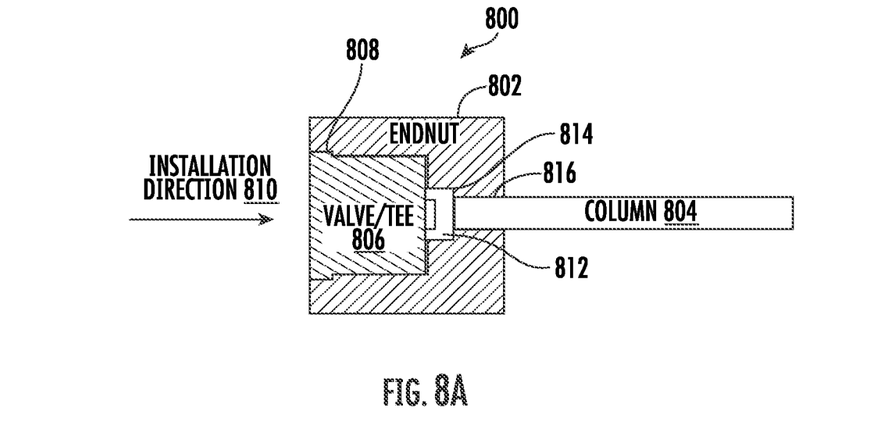
FIG. 8A depicts a cross sectional view of an end fitting with an integral valve/tee attached to a liquid chromatography column for installation together into the end fitting in an exemplary embodiment.
Figure 8B:
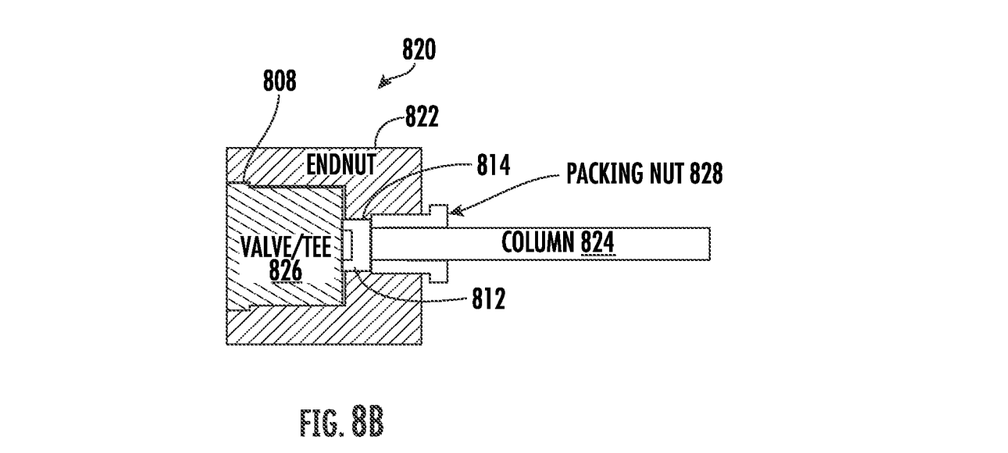
FIG. 8B depicts a cross sectional view of an end fitting with an integral valve/tee and a liquid chromatography column that may be installed together or separately into the end fitting in an exemplary embodiment.

FIG. 8B depicts an alternative configuration 820, wherein the liquid chromatography column 824 may be installed or removed separately from the valve/tee 826. The valve/tee 826 still is installed in a similar manner as described for FIG. 8A and rests in seat 808. The liquid chromatography column 824, however, has a concentric end nut 828 that threads into the end fitting 822 to secure the liquid chromatography column 824. The feature 812 still rests in the seat 814 as described above.

Figure 8C:
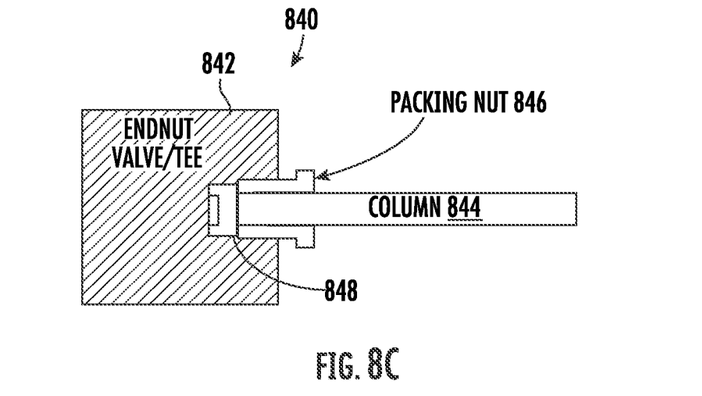
FIG. 8C depicts a cross sectional view of an end fitting with a permanently integral valve/tee and a liquid chromatography column that may be installed separately into the end fitting in an exemplary embodiment.

FIG. 8C depicts a third configuration 840, in which the valve/tee 842 is permanently integrated into the end fitting 842. In this configuration, the liquid chromatography column 844 is still removable. A packing nut 846 like that shown in FIG. 8B is provided. A connector 848 is provided for providing an interface between the liquid chromatography column 844 and the end fitting 842.

It should be appreciated that the configurations of FIGS. 8A, 8B and 8C are merely illustrative and not intended to be limiting. Other configurations may be used to secure the valve/tee and the liquid chromatography column with the outlet end fitting.

The integration of the tee or valve into the end fitting helps to diminish sample dispersion found with conventional systems that deploy external tees and valves post-column.

While exemplary embodiments have been described herein, various changes in form and detail may be mad without departing from the intended scope as defined in the appended claims.

The invention claimed is:

1. An end fitting for a liquid chromatography column, comprising:
    an interface for a fluidic connection with a liquid chromatography column to receive output fluidic flow from the liquid chromatography column;
    a first port for inputting or outputting fluidic flow;
    a first fluidic path leading from the interface to the first port;
    a first integrated valve positioned along the first fluidic path for opening or closing fluid flow along the first fluidic path;
    a second port for inputting or outputting fluidic flow that is distinct from the output flow of the liquid chromatography column;
    a second fluidic path leading from the second port to merge into the first fluidic path so that fluidic input from the second port is added to the output fluidic flow from the liquid chromatography column; and
    a second integrated valve positioned along the second fluidic path for opening or closing fluid flow along the second fluidic path.

2. The end fitting of claim 1, further comprising an integral tee, the integral providing the first fluidic path and the second fluidic path.

3. The end fitting of claim 2, further comprising a third port and a third fluidic path for diverting output fluidic flow from the liquid chromatography column to the third port, wherein the third fluidic path is part of the integral tee.

4. The end fitting of claim 1, further comprising a third port and a third fluidic path for diverting output fluidic flow from the liquid chromatography column to the third port.

5. The end fitting of claim 1, wherein the first valve is a rotary valve, a ball valve, a linear shear valve, a spool valve or a pin valve.

6. The end fitting of claim 5, further comprising a third integrated valve with a position that opens the third fluidic path and another position that closes the third fluidic path.

7. An end fitting for a liquid chromatography column, comprising:
    an interface for a fluidic connection with a liquid chromatography column to receive fluidic flow from the liquid chromatography column;
    a secondary port in fluid communication with the interface for either receiving input fluid flow or diverting a portion of fluidic flow from the liquid chromatography column;
    a first integral valve for opening or closing fluidic flow to or from the secondary port;
    multiple output ports for outputting an output fluidic flow including at least in part the output fluidic flow from the chromatography column; and
    second integral valve for selecting which of the output ports receives the output fluidic flow.

8. The end fitting of claim 7, wherein the second valve selects only a single one of the output ports to receive the output fluidic flow at a time.

9. The end fitting of claim 7, further comprising an additional secondary port.

10. The end fitting of claim 9, further comprising a third integrated valve controls fluidic flow with the secondary port.

11. An end fitting for a liquid chromatography column, comprising:
- an interface for a fluidic connection with a liquid chromatography column to receive fluidic flow from the liquid chromatography column;
- first and second secondary ports;
- a first fluidic path leading to the first secondary port;
- a first integral valve for controlling fluidic flow in the first fluidic path;
- a second fluidic path leading to the first secondary port;
- a second integral valve for controlling fluidic flow in the second fluidic path;
- a third fluidic path leading from the interface to output ports; and
- a third integral valve for selecting one of the output ports.

12. The end fitting of claim 11, wherein at least one of the secondary ports is configured to divert a portion of the fluidic flow from the chromatography column.

13. The end fitting of claim 12, wherein the third integral valve opens and closes the separate fluidic paths leading to respective ones of the output ports.

14. The end fitting of claim 11, wherein there are separate fluidic flow paths leading to respective ones of the output ports.

15. The end fitting of claim 14, wherein each of the integral valves is a rotary valve, a ball valve, a linear shear valve, a spool valve or a pin valve.

* * * * *